(12) United States Patent
Usami et al.

(10) Patent No.: US 10,351,073 B2
(45) Date of Patent: Jul. 16, 2019

(54) PHOTOGRAPHING APPARATUS FOR VEHICLE

(71) Applicant: TOYOTA JIDOSHA KABUSHIKI KAISHA, Toyota-shi, Aichi (JP)

(72) Inventors: Masayuki Usami, Nagoya (JP); Kunihiko Toyofuku, Toyota (JP); Ryuichi Shinkai, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 15/438,281

(22) Filed: Feb. 21, 2017

(65) Prior Publication Data

US 2017/0334364 A1    Nov. 23, 2017

(30) Foreign Application Priority Data

May 18, 2016 (JP) .................................. 2016-099224

(51) Int. Cl.
| | |
|---|---|
| *B60R 11/04* | (2006.01) |
| *G03B 17/55* | (2006.01) |
| *H04N 5/225* | (2006.01) |
| *B60S 1/02* | (2006.01) |
| *B60R 11/00* | (2006.01) |

(52) U.S. Cl.
CPC ............. *B60R 11/04* (2013.01); *B60S 1/023* (2013.01); *G03B 17/55* (2013.01); *H04N 5/2253* (2013.01); *H04N 5/2257* (2013.01); *B60R 2011/0026* (2013.01); *B60R 2011/0063* (2013.01)

(58) Field of Classification Search
CPC ............. B60R 11/04; B60R 2011/0026; B60R 2011/0063; G03B 17/55; H04N 5/2253; H04N 5/2257; B60S 1/023
See application file for complete search history.

(56) References Cited

U.S. PATENT DOCUMENTS

| 5,176,733 A * | 1/1993 | Koss ................... C03B 23/0258 65/107 |
| 7,731,373 B2 * | 6/2010 | Oskarsson .............. B60S 1/026 359/512 |
| 9,931,983 B2 * | 4/2018 | Yun .......................... B60S 1/54 |
| 2007/0164011 A1 * | 7/2007 | Bulgajewski .......... H05B 3/845 219/219 |
| 2012/0200973 A1 * | 8/2012 | Shiraishi .............. H05K 1/0265 361/104 |

(Continued)

FOREIGN PATENT DOCUMENTS

| JP | 2014-101004 A | 6/2014 |
| JP | 2015-509458 A | 3/2015 |

*Primary Examiner* — Gelek W Topgyal
(74) *Attorney, Agent, or Firm* — Oliff PLC

(57) ABSTRACT

The photographing apparatus for vehicle includes image pickup device which is disposed inside of a window part provided in a vehicle and receives photographing luminous flux passing through a light transmissive portion, a heater, composed of heated wire, generates heat when being supplied electrical power from electric power source, a heated portion, fixed to the heater, faces an inner surface of the light transmissive portion and gives radiant heat to the light transmissive portion when receiving heat from the heater. The heated portion is a plate having a polygonal shape. Both ends of the heater are positioned at two different corner portions of the heated portion.

5 Claims, 12 Drawing Sheets

(56) References Cited

U.S. PATENT DOCUMENTS

| | | | |
|---|---|---|---|
| 2012/0234816 A1* | 9/2012 | Petrenko | H05B 3/84 219/203 |
| 2014/0022620 A1* | 1/2014 | Baur | B60R 1/082 359/267 |
| 2015/0034621 A1 | 2/2015 | Timmermann et al. | |
| 2016/0091714 A1* | 3/2016 | Hui | H04N 5/2251 359/512 |
| 2016/0105958 A1* | 4/2016 | Nakamura | H01L 23/49822 361/782 |
| 2016/0375828 A1* | 12/2016 | Yun | B60S 1/54 701/48 |

\* cited by examiner

PHOTOGRAPHING APPARATUS FOR VEHICLE

BACKGROUND OF THE INVENTION

1. Field of the Invention

The present invention relates to a photographing apparatus for vehicle, for example, which is provided on a vehicle interior side of a front window of a vehicle.

2. Description of the Related Art

A photographing apparatus may be provided on a vehicle interior side surface of a front window of a vehicle.

This photographing apparatus, for example, is used as a part of a pre-crash safety system (hereinafter, it is referred to as "PCS".).

This type of photographing apparatus is provided with a bracket, which is fixed to the inner surface (rear surface) of the front window, and a camera unit, which is supported by the bracket.

The camera unit is provided with a lens and an image pickup device located immediately behind the lens.

For example, when another vehicle is positioned in front of the vehicle equipped with PCS (hereinafter, it is referred to as "leading vehicle"), reflected luminous flux reflected by the leading vehicle is received by the image pickup device after passing through a light transmissive portion, which is a portion of the front window, a gap between the light transmissive portion and the bracket, and the lens.

The image pickup device converts the reflected luminous flux (an object image) to imaging data (electrical signals), and transmits the imaging data to a control unit of the vehicle.

Then, on the basis of the received imaging data, the control unit determines whether or not the imagined object is an obstacle, and calculates the distance between the obstacle and the vehicle.

When the control unit determines that the imagined object is an obstacle and the distance between the obstacle and the vehicle is shorter than a predetermined distance set in advance, the control unit activates a brake device of the vehicle.

By the way, at the low outside air temperature, if a heater is used inside the vehicle, condensation may be generated on the light transmissive portion of the front window. Further, when the outside air temperature is low, ice and/or frost may adhere on the outer surface of the light transmissive portion.

When such a phenomenon occurs on the light transmissive portion, the image pickup device may image blurred object image, or the image pickup device can fail to image the obstacle. Then, in this case, the control unit can fail to determine whether or not the imagined object is an obstacle. Furthermore, the control unit can fail to calculate the distance between the obstacle and the vehicle.

Then, in the vehicle of Japanese Patent Application Laid-open No. 2014-101004, a heater composed of electrically heated wire is embedded in the light transmissive portion of the front window. An electrical circuit connected to this heater is connected to an electric power source of the vehicle. When electric power of the electric power source is supplied to the electrical circuit, the heater generates heat. Then, even when condensation is generated on the light transmissive portion of the front window or ice and/or frost adheres to the outer surface of the light transmissive portion, the heater can disperse the condensation, the frost, the ice, and the like on the light transmissive portion by heating the light transmissive portion.

Then, such a heater can reduce the risk that the image pickup device images blurred object image and/or the image pickup device fail to image an obstacle by heating the light transmissive portion.

SUMMARY OF THE INVENTION

By the way, instead of embedding the heater in the light transmissive portion of the front window, it is possible to dispose a heated portion, which is a polygonal-shaped plate and faces the vehicle interior side surface of the light transmissive portion, in the vehicle interior space and to fix the heater to this heated portion. In this case, the heater is fixed to the heated portion so that both ends of the heater are located at one of corner portions of the heated portion (polygonal shape).

In this case, when the heated portion is heated by the heater, radiant heat emitted from the heated portion is transmitted to the light transmissive portion. This radiant heat disperses condensation, frost, ice, and the like on the light transmissive portion.

An end of each of electrical leads, which are components of the electrical circuit, is connected to each of both ends of the heater.

The both ends of the heater and the ends of the electrical leads can be connected to each other by an electrically conductive connector (for example, solder or the like).

However, total value (sum) of a cross-section area of the both ends of the heater and a cross-section area of the electrically conductive connector is greater than a cross-section area of the heater alone. In other words, combined value of electrical resistance of the both ends of the heater and the electrically conductive connector is smaller than that of the heater.

Then, the amount of heat generated at the both ends of the heater becomes smaller than that of heat generated in the portion of the heater excluding the both ends.

Then, if the heater is fixed to the heated portion so that the distance between the both ends of the heater is short, the temperature of one narrow region including the both ends of the heater and a portion of the heated portion adjacent to the both ends of the heater may apparently be lower than that of another region, which includes a portion of the heater excluding the both ends (it is also referred to as "excluded portion") and a portion of the heated portion adjacent to this excluded portion of the heater. This can cause condensation, frost, ice, and the like generated on a region of the light transmissive portion of the front window, which faces the both ends of the heater, not to disperse.

Further, when the both ends of the heater are close to each other, the distance between two electrically conductive connectors, which are provided to the both ends of the heater, is short. Then, if a foreign material (for example, water and/or dust) enters a space between the two electrically conductive connectors, the two electrically conductive connectors may short-circuit.

If the short-circuit occurs, the heater can fail to achieve the desired heating function.

The present invention has been made to cope with the above problems. Namely, the present invention has an object to provide a photographing apparatus for vehicle which that heat a light transmissive portion of a window part as evenly as possible by a heater composed of electrically heated wire, and that can reduce a possibility of short-circuit between both ends of the heater.

In order to achieve the object, a photographing apparatus for vehicle comprises image pickup means (30), a heater (47A, 47B), and a heated portion (40A, 40B, 40C, 40D, 40E).

The image pickup means is disposed inside of a window part (85) that is made of translucent material and is provided in a vehicle. The image pickup means receives photographing luminous flux passing through a light transmissive portion (85a) that is a portion of the window part.

The heater is composed of electrically heated wire, and is for forming a portion of an electrical circuit connected to an electric power source. The heater generates heat when being supplied electrical power from the electric power source.

The heated portion, to which the heater is fixed, faces an inner surface of the light transmissive portion. The heated portion gives radiant heat to the light transmissive portion when receiving heat from the heater.

The heated portion is a plate having a polygonal shape.

Both ends of the heater are positioned at two different corner portions of the heated portion.

The "polygonal shape" includes "approximately polygonal shape". Namely, for example, a shape of the heated portion, in which an outer peripheral portion of each of corner portions is composed of a curved surface, is also treated as "polygonal shape".

The "corner portion" is a concept including "vertex adjacent corner portion" and "vicinity of vertex".

The "vertex adjacent corner portion" is a region positioned at a more vertex side than a dividing point, when the one dividing point is provided on a straight line segment connecting the center of gravity of the heated portion and the vertex of a corner portion of the heated portion. This dividing point is provided on the line segment so that a distance between the vertex and the dividing point is one-fifth (⅕) of the length of the whole line segment.

On the other hand, the "vicinity of vertex" is a region positioned between a midpoint and the dividing point, when the midpoint is provided on the line segment so as to divides the line segment into two equal parts.

In the present invention, the heated portion, which is heated by the heater and heats the light transmissive portion of the window part by giving radiant heat that the heated portion generates, is a plate having a polygonal shape, and the both ends of the heater is positioned at two different corner portions of the heated portion.

Then, the distance between the both ends of the heater is a certain length. In other words, the distance between the both ends of the heater is not extremely short.

Then, for example, even when an end portion of each of electrical leads, which are components of the electrical circuit, is connected to the both ends of the heater by two solders respectively, the distance between each of solders is a certain length.

Electrical resistance of an integral portion including the both ends of the heater and the solders is smaller than that of the heater excluding the both ends.

Then, a portion of the heater, which has relative low temperature in the heater, don't concentrate in one narrow area.

Then, a portion of entire area of the light transmissive portion doesn't become much lower temperature compared with the other portion of the entire area of the light transmissive portion. In other words, the entire light transmissive portion can be heated substantially evenly by the heated portion.

If a foreign material (for example, water and/or dust) enters a space between these two solders, this foreign material is unlikely to come in contact with these two solders at the same time is low. In other words, a short-circuit is unlikely to occur between the two solders by this foreign material.

The photographing apparatus for vehicle further comprises a bracket (12), a middle part electrical lead (53, 54), and two electrical cables (60, 63).

The bracket supports the image pickup means and is supported by the inner surface of the window part.

The middle part electrical lead is provided in the heated portion. The middle part electrical lead is connected at one end (54a) thereof to one end (48b) of the heater.

The two electrical cables are connected to the electric power source.

One of the two electrical cables (60) is connected at one end thereof to the other end (48a) of the heater.

The other of the two electrical cables (63) is connected at one end thereof to the other end (53a) of the middle part electrical lead.

The bracket includes a support (13) capable of supporting the heated portion.

The heated portion is composed of one of a first heated portion (40A) and a second heated portion (40B).

The first heated portion and the second heated portion are symmetrical about the center lines of the heated portion respectively and can be supported by the support.

The heater is composed of one of a first heater (47A) that is fixed to the first heated portion, and a second heater (47B) that is fixed to the second heated portion and is symmetrical to the first heater about the center line.

When an arrangement (placement) of electrical system parts in vehicle is changed, the drawing manner (drawing direction) of the electrical cable from the heated portion (the heater and the middle part electrical lead) have to be changed.

When the present invention is configured in such a manner, it is possible to prepare the first set and the second set. The first set is provided with the first heated portion to which the first heater is fixed, the middle part electrical lead, and the two electrical cables. The second set is provided with the second heated portion to which the second heater is fixed, the middle part electrical lead, and the two electrical cables. Furthermore, either the first heated portion or the second heated portion can be selectively supported by the support of the bracket.

The drawing manner (drawing direction) of the electrical cables from the heated portion (the heater, the middle part electrical lead) can be changed by selecting one of the first set and the second set. Namely, the drawing manner (drawing direction) of the electrical cable from the heated portion (the heater, the middle part electrical lead) can be changed while taking the arrangement (placement) of the electrical system parts in the vehicle into account.

The heated portion may have a regular polygonal shape.

The "regular polygonal shape" includes "approximately regular polygonal shape". Namely, for example, a shape of the heated portion in which an outer peripheral portion of each of the corner portions is composed of a curved surface is also treated as "regular polygonal shape".

When the present invention is configured in such a manner, the drawing manner (drawing direction) of the electrical cable from the heated portion can be changed by rotating the heated portion.

A facing surface of the heated portion against the window part may be a convexly curved surface projecting toward the window part.

When the present invention is configured in such a manner, a facing surface of the heated portion, which faces the window part, emits radiant heat toward the light transmissive portion while diffusing the radiant heat radially.

Then, a wide area of the light transmissive portion can be heated by the heated portion.

In the above description, names and references used in the following descriptions regarding embodiments are added with parentheses to the elements of the present invention, in order to understand the invention. However, those names and references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

A photographing apparatus for vehicle according to an embodiment of the present invention will be described hereinafter with reference to the accompanying drawings.

Figure 1:
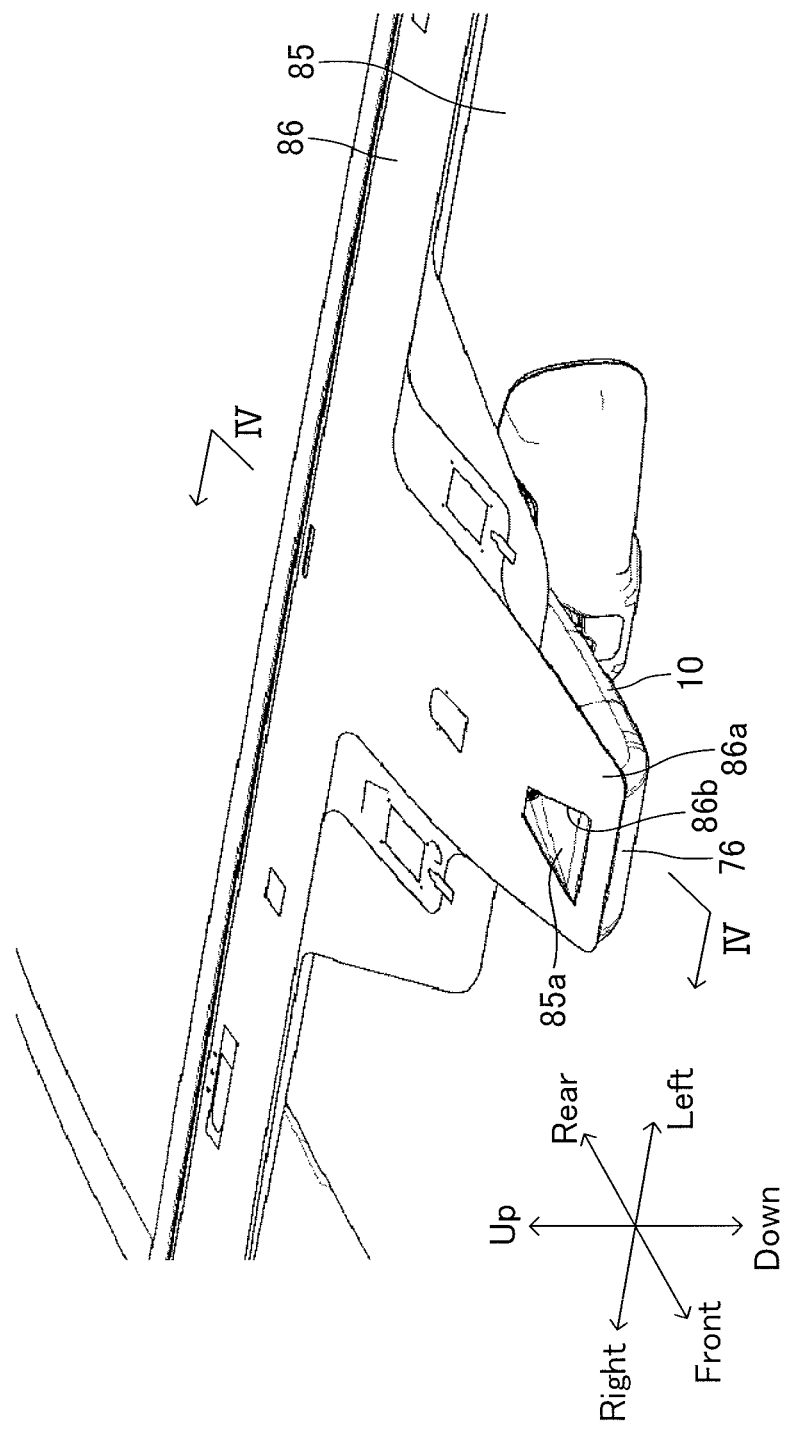
FIG. 1 is a perspective view of a photographing apparatus for vehicle and a front window viewed from the front according to an embodiment of the present invention.
Figure 4:
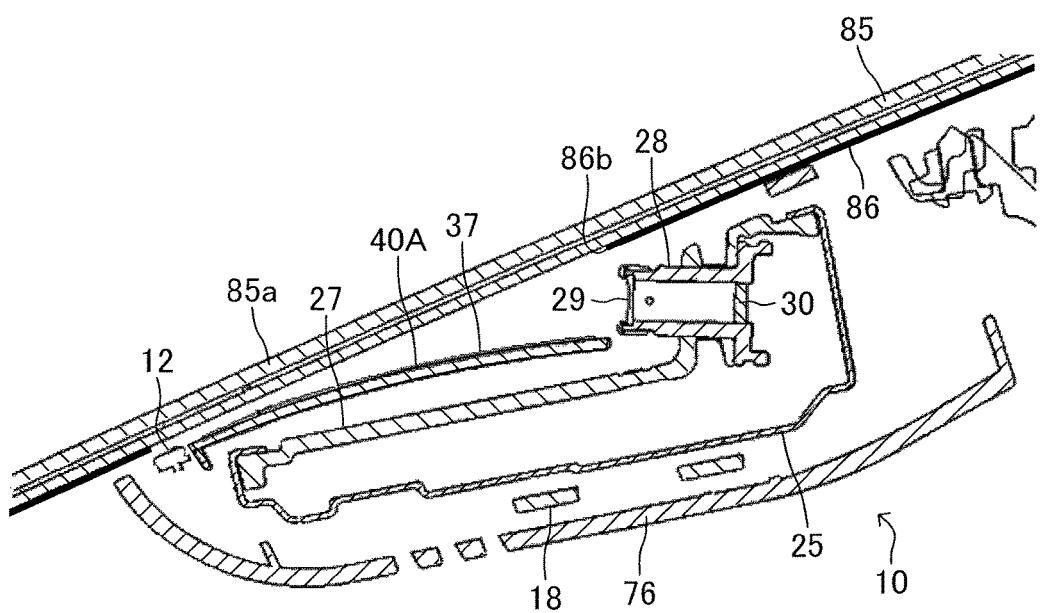
FIG. 4 is a cross sectional view of the photographing apparatus for vehicle taken along the line IV-IV of FIG. 1.

A vehicle is provided with a front window 85 shown in FIGS. 1 and 4. This front window 85 is made of transparent material (for example, glass, resin, etc.). As shown in FIGS. 1 and 4, the front window 85 is inclined with respect to the vehicle body in such a manner that the front window 85 gradually extends forward as approaching from the upper end thereof to the lower end thereof.

As shown in FIG. 1, a light shielding sheet 86, whose whole shape is a substantially T-shape, is pasted on an upper edge and the vicinity thereof of the rear surface (i.e., vehicle interior side surface) of the front window 85. A front extension part 86a extending forward and obliquely downward is formed at the central portion of the light shielding sheet 86. A light transmissive hole 86b having a substantially trapezoidal shape is formed in the vicinity of the front end of the front extension part 86a. A portion of the front window 85, which faces the light transmissive hole 86b, is a light transmissive portion 85a.

The vehicle is provided with brake devices capable of exerting a braking force on each of wheels, a brake actuator for operating the brake devices, and a vehicle speed detection device for detecting a vehicle speed (all of which are not shown.). The brake actuator is linked to a brake pedal provided inside the vehicle. When a driver depresses the brake pedal with his/her foot, the brake actuator is actuated. Since the brake actuator activates each of the brake devices, braking force is exerted on each wheel from each of the brake devices.

Furthermore, the vehicle is provided with an electrical control unit 100 (not shown. Hereinafter, it is referred to as "control unit") that is connected to the brake actuator and the vehicle speed detecting device (see FIG. 9).

"Approach determination data" is stored in a memory of this control unit 100. This "approach determination data" is a data represents a predetermined distance. When a distance between the vehicle running forward and an obstacle located in front of the vehicle is shorter than this predetermined distance, the brake devices, for example, have to be activated.

Figure 9:
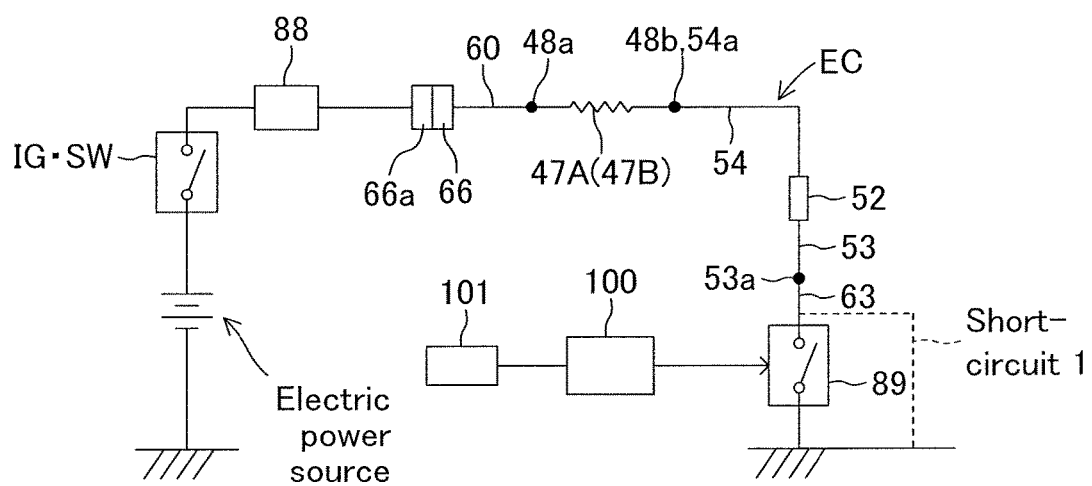
FIG. 9 is a schematic view of a series electrical circuit including a heater, the fuse module, and the cable module.

Furthermore, the vehicle is provided with a temperature sensor 101 for measuring air temperature outside the vehicle (see FIG. 9). This temperature sensor 101 is connected to the control unit 100.

As shown in FIGS. 1 and 4, a photographing apparatus for vehicle 10 (hereinafter, it is referred to as "photographing apparatus 10") is fixed to the vehicle interior side surface of the front window 85 so as to face the light transmissive portion 85a.

Figure 2:
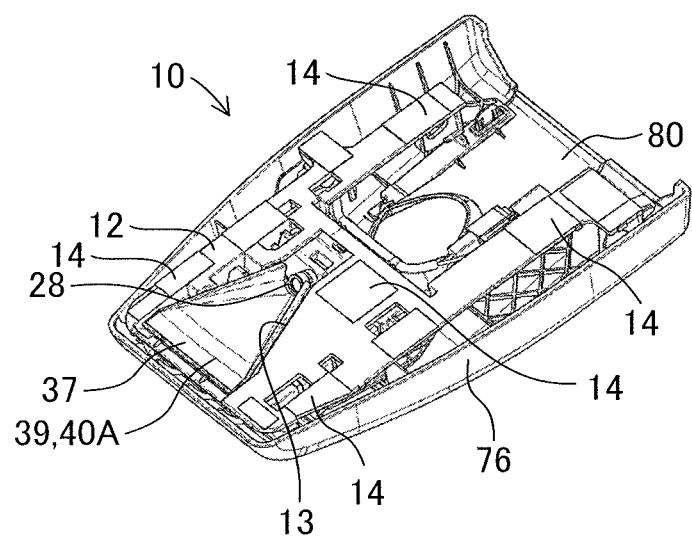
FIG. 2 is a perspective view of the photographing apparatus for vehicle viewed from the above.
Figure 3:
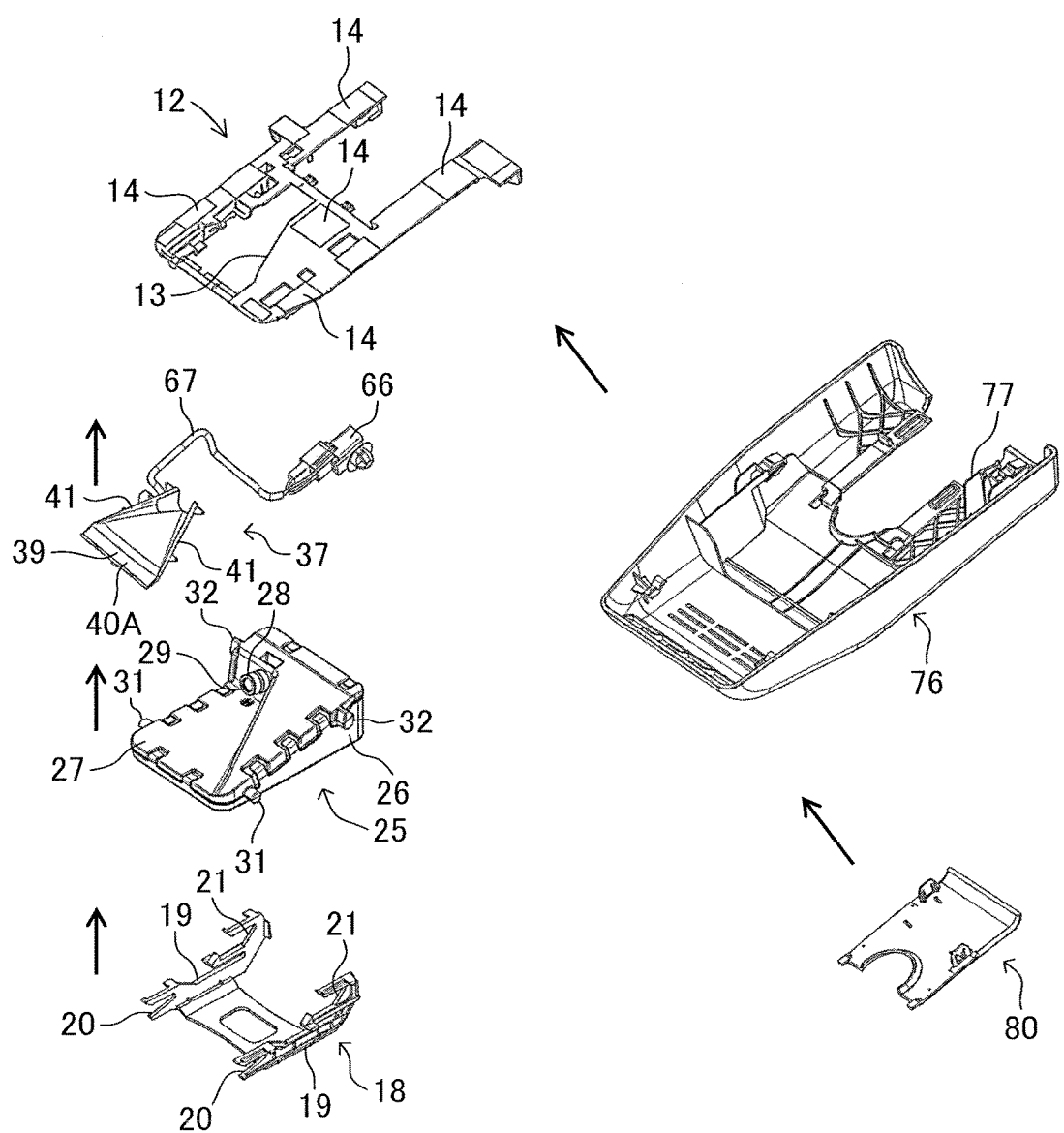
FIG. 3 is an exploded perspective view of the photographing apparatus for vehicle viewed from the above.

As shown in FIGS. 2 through 4, the photographing apparatus 10 is provided with a bracket 12, a camera support bracket 18, a camera unit 25, a light shielding and heating unit 37 (or a light shielding and heating unit 37' described later), a main cover 76, and a sub cover 80 as main components.

The bracket 12 is a single piece (integrally molded article) made of hard resin.

A support 13 having a substantially trapezoidal shape is formed in the bracket 12 as a through-hole.

Furthermore, a plurality of adhesive surfaces 14 are formed on the upper surface of the bracket 12.

The camera support bracket 18 is a single piece (integrally molded article) made of hard resin.

The camera support bracket 18 is provided with left and right pair of camera support pieces 19. A first supporting recess 20 is formed on the front end surface of each of the left and right camera support pieces 19. Additionally, a second supporting recess 21 is formed in the rear portion of each of the left and right camera support pieces 19.

The camera support bracket 18 is removably attached to the bottom surface of the bracket 12.

The camera unit 25 is provided with a housing 26 that forms the outer shape of the camera unit 25 and is a single piece (integrally molded article) made of resin. As illustrated in the figures, the bottom surface and the upper surface of the housing 26 are not parallel to each other.

A hood support recess 27 having a substantially trapezoidal shape in plane view is formed on the upper surface of the housing 26.

An imaging part 28 is fixed to the rear end surface of the hood support recess 27. As shown in FIG. 4, the imaging part 28 is provided with a lens 29 and an image pickup device 30 located immediately behind the lens 29.

The image pickup device 30 is a compound eye type. The image pickup device 30 receives reflected luminous flux (photographing luminous flux) that is a natural light passing through the lens 29 after being reflected rearward by an obstacle located in front of the camera unit 25. The size (cross-sectional shape) of the reflected luminous flux entering the imaging part 28 is defined by the angle of view of the lens 29 of the imaging part 28. The cross-sectional shape of the reflected luminous flux has such a predetermined size that the reflected luminous flux does not interfere with the surface of a heated portion 40A (40B) of a light shielding and heating unit 37 (37'), which will be described later.

First supported axes 31, which extend in a lateral direction and are coaxial with each other, protrude from vicinities of the front ends of the left and right side surfaces of the housing 26, respectively.

Second supported axes 32, which are located at a position rearward with respect to the first supported axes 31, protrude from the left and right side surfaces of the housing 26, respectively. The left and right second supported axes 32 extend in a lateral direction and are coaxial with each other.

The camera unit 25, whose housing 26 is located immediately above the bottom of the camera support bracket 18 and located between the left and right camera support pieces 19, is to be supported by the camera support bracket 18 by engaging the left and right first supported axes 31 with the left and right first supporting recesses 20 respectively and engaging the left and right second supported axes 32 with the left and right second supporting recesses 21 respectively.

The light shielding and heating unit 37 shown in FIGS. 3 through 8 is provided with, as main components, a light shielding hood 39, a heater module 45, a double-faced adhesive tape 47C, a fuse module 50, a heat insulator 56, a cable module 59, and a banding band 74.

The light shielding and heating unit 37 shown in FIGS. 3 through 8 may be referred to as "first set 37" in this specification.

The light shielding hood 39 is a single piece (integrally molded article) made of hard resin.

The light shielding hood 39 is integrally provided with a heated portion 40A and a pair of side wall portions 41. The heated portion 40A is a plate whose shape is a regular triangle (i.e., the heated portion 40A is a regular triangle shape in a front view). The wall portions 41 extend upwards from left and right side edges of the heated portion 40A.

Figure 5:
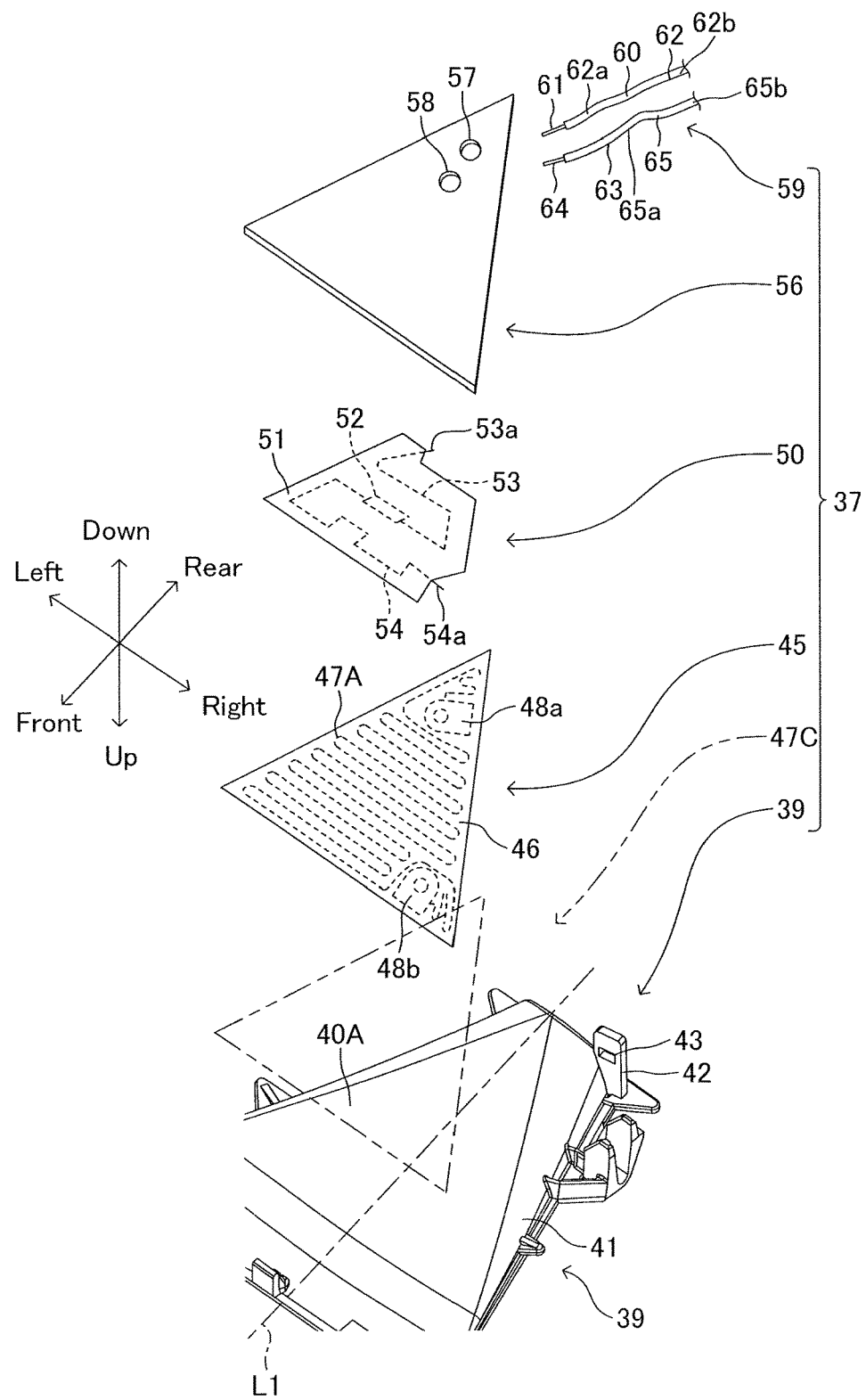
FIG. 5 is an exploded perspective view of a light shielding and heating unit (a first set) viewed from the below.

The heated portion 40A is symmetrical with respect to the center line L1 extending in the forward and rearward direction shown in FIG. 5. Further, as shown in FIG. 4, the cross-sectional shape of the heated portion 40A is a curved shape rather than a straight shape. More specifically, the cross-sectional shape of the heated portion 40A is convexly curved shape projecting upward. Furthermore, as described later, when the light shielding and heating unit 37 is fixed to the front window 85 via the bracket 12, the cross-sectional shape of the heated portion 40A is convexly curved shape projecting toward the light transmissive portion 85a.

As shown in the figures, the heights of the side wall portions 41 gradually increase toward the rear ends thereof from the front ends thereof.

Figure 6:
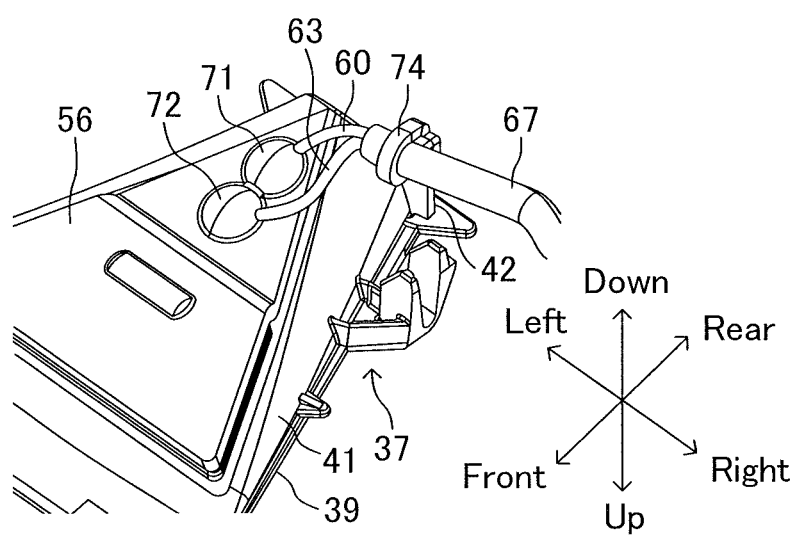
FIG. 6 is a perspective view of the light shielding and heating unit (the first set) viewed from the below.

As shown in FIGS. 5 and 6, a cable support 42 is provided in the vicinity of the right end of the rear end portion of the lower surface of the light shielding hood 39. The cable support 42 extends downward from the lower surface of the light shielding hood 39. A band inserting hole 43 is formed in the cable support 42 as a through-hole.

The heater module 45 is integrally provided with a PET sheet 46 and a heater 47A.

The PET sheet 46 is made of PET (polyethylene terephthalate), and its outer shape is substantially the same as that of the heated portion 40A. Namely, the PET sheet 46 has a regular triangle shape that is symmetrical with respect to the center line L1 shown in FIG. 7. The PET sheet 46 has a good electrical insulation property.

The heater 47A, which is composed of an electrically heated wire made of a metal excellent in electrical conductivity, is formed on almost the entirety of the upper surface of the PET sheet 46. For example, brass is available for the material of the heater 47A. Both ends of the heater 47A are composed of a pair of lands 48a, 48b, respectively. Each of the areas of the lands 48a, 48b are larger than that of the other portions of the heater 47A. The lands 48a, 48b are exposed on the upper surface and the lower surface of the PET sheet 46. The land 48a is provided in a vicinity of rear vertex of the PET sheet 46. The land 48b is provided in a vicinity of front right vertex of the PET sheet 46. In this specification, the "vicinity of vertex" is a region positioned between a midpoint and a dividing point, when the midpoint is provided on a line segment connecting the center of gravity G of the heated portion 40A (see FIG. 7) and the vertex of a corner portion of the heated portion 40A so as to divide the line segment into two equal parts, and the dividing point is provided on the line segment so that the distance between the vertex and the dividing point is one-fifth (⅕) of the length of the whole line segment. In this specification, on the other hand, a region positioned on the vertex side with respect to the dividing point is referred to as "vertex adjacent corner portion". Portion of the heater 47A excluding the lands 48a, 48a is formed on the upper surface of the PET sheet 46 by printing.

The lower surface of the double-faced adhesive tape 47C having substantially the same shape as those of the heated portion 40A and the PET sheet 46 is pasted on the upper surface of the PET sheet 46 so as to cover the heater 47A. The heater module 45 is fixed to the light shielding hood 39 by pasting the upper surface of the double-faced adhesive tape 47C on the lower surface of the heated portion 40A. The double-faced adhesive tape 47C has good thermal conductivity.

The peripheral portion of the PET sheet 46 overlaps the peripheral portions of the double-faced adhesive tape 47C and the heated portion 40A.

The fuse module 50 is an integrated object including a double-faced adhesive tape 51, a fuse 52, and two electrical leads 53, 54.

Figure 7:
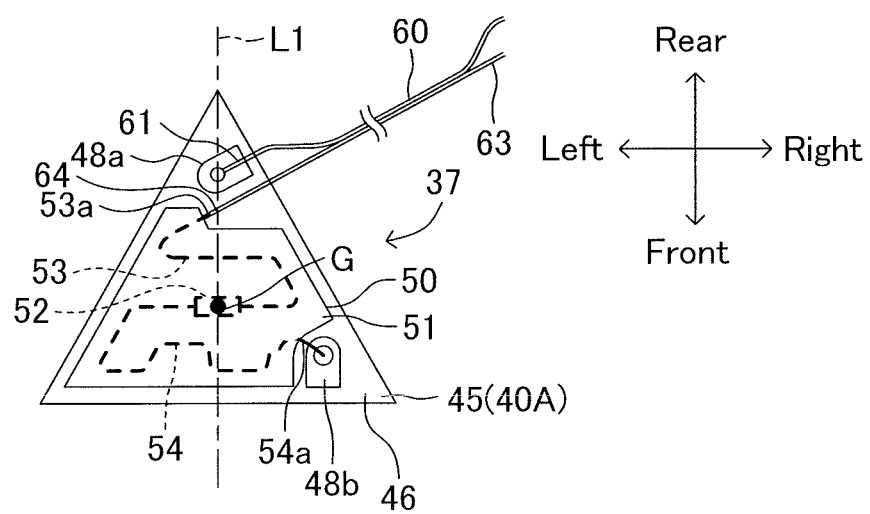
FIG. 7 is a schematic view of a heated portion, a heater module, a fuse module, and a cable module viewed from the below.

The double-faced adhesive tape 51 is a sheet member having a shape shown in FIGS. 5 and 7. Both surfaces of the double-faced adhesive tape 51 are adhesive surfaces. Thermal conductivity of the double-faced adhesive tape 51 is lower (worse) than those of the light shielding hood 39, the PET sheet 46, and the double-faced adhesive tape 47C.

The fuse 52, which is a current limiting element, includes a cylindrical insulating casing and a soluble metal that has electrical conductivity and is fixed in the insulating case. The insulating casing of the fuse 52 is pasted on the substantially central portion of the upper surface of the double-faced adhesive tape 51.

The two electrical leads 53, 54 are pasted on the upper surface of the double-faced adhesive tape 51 in the manner shown in the figures. One ends of the two electrical leads 53, 54 are positioned in the insulating casing of the fuse 52 and are connected to both ends of the soluble metal, respectively. On the other hand, connecting ends 53a, 54a, which are the other ends of the two electrical leads 53, 54, are positioned on outer peripheral side with respect to the double-faced adhesive tape 51 as shown in FIGS. 5 and 7.

The fuse module 50 is fixed to the heater module 45 by pasting the upper surface of the double-faced adhesive tape 51 on the lower surface of the PET sheet 46.

As shown in FIG. 7, the entire fuse module 50 is located on inner peripheral side with respect to the outer peripheral edge of the PET sheet 46. The pair of the lands 48a, 48b of the heater module 45 are located on the outer peripheral side with respect to the double-faced adhesive tape 51. Furthermore, as shown in FIG. 7, the fuse 52 of the fuse module 50 is located at a position overlapping the position of the center of gravity G of the heated portion 40A in the thickness direction of the heated portion 40A. Namely, the fuse 52 is arranged on a straight line, which extends in the thickness direction of the heated portion 40A and passes through the center of gravity G.

The fuse 52 and the electrical leads 53, 54 (excluding the connecting ends 53a, 54a) are in contact with the lower surface of the PET sheet 46. In other words, the fuse 52 and the electrical leads 53, 54 (excluding the connecting ends 53a, 54a) and the heater 47A excluding the land 48a, 48b are insulated from each other by the PET sheet 46 that is located between them.

Furthermore, the connecting end 54a of the electrical lead 54 is soldered to the bottom surface of the land 48b of the PET sheet 46 (not shown).

The heat Insulator 56 having an electrical insulation property is substantially the same shape as the heated portion 40A. Namely, the heat insulator 56 is a sheet member having a regular triangle shape. A pair of through-holes 57, 58 are formed in a vicinity of the rear end vertex of the heat insulator 56. Thermal conductivity of the heat insulator 56 is lower (worse) than those of the light shielding hood 39, the PET sheet 46, the double-faced adhesive tape 47C, and the double-faced adhesive tape 51.

The upper surface of the heat insulator 56 is pasted on the lower surface of the double-faced adhesive tape 51. A portion of the upper surface of the heat insulator 56, which does not face the double-faced adhesive tape 51, is in contact with the lower surface of the PET sheet 46. Further, the peripheral portion of the heat insulator 56, which is positioned on outer peripheral side with respect to the peripheral edges of the heated portion 40A and the PET sheet 46, is in contact with the light shielding hood 39. In addition, the through-holes 57, 58 of the heat insulator 56 are located on the center line L1 when viewed in the thickness direction of the heated portion 40A.

When the heat when the insulator 56 is fixed to the double-faced adhesive tape 51, the through-hole 57 is located immediately below the land 48a of the sheet 46 and the through-hole 58 is located immediately below the connecting end 53a of the electrical lead 53.

The cable module 59 is provided with a first electrical cable 60 (shown in FIG. 5, etc.), a second electrical cable 63 (shown in FIG. 5, etc.), a connector 66, which is connected to one ends of the first electrical cable 60 and the second electrical cable 63 (shown in FIGS. 3 and 9), and a banding tube 67.

The first electrical cable 60 is provided with an electric wire 61 composed of metal wire excellent in electrical conductivity and a covering tube 62, which covers the outer peripheral surface of the electric wire 61 except for both end portions thereof. Similarly, the second electrical cable 63 is provided with an electric wire 64 composed of metal wire excellent in electrical conductivity and a covering tube 65, which covers the outer peripheral surface of the electric wire 64 except for both end portions thereof.

Two metal contacts (not shown) are provided inside the connector 66. One of the two contacts is an anode, and the other of the two contacts is a cathode. One ends of the first electrical cable 60 and the second electrical cable 63 are connected to the connector 66. One ends of the electric wire 61 and the electric wire 64 are connected to the two contacts, respectively.

Furthermore, as shown in FIGS. 3 and 6, the covering tube 62 and the covering tubes 65 excluding front and rear end portions thereof are inserted into sole banding tube 67. Namely, the banding tube 67 bundles the covering tube 62 and the covering tube 65 so that the covering tube 62 and the covering tube 65 do not separate from each other.

Figure 8A:
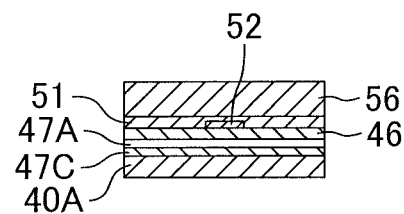
FIG. 8A is a cross sectional view of the light shielding and heating unit (the first set) taken along a line passing through a fuse.
Figure 8B:
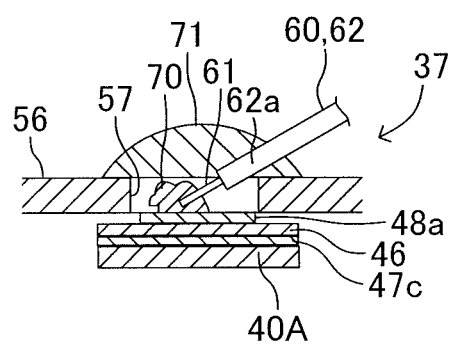
FIG. 8B is a cross sectional view of the light shielding and heating unit (the first set) taken along a line passing through a sealant.

As shown in FIG. 8B, the other end of the electric wire 61 of the first electrical cable 60 is inserted into the through-hole 57 of the heat insulator 56, and the other end of the electric wire 61 is connected to the lower surface of the land 48a by solder 70.

Although illustration is omitted, the other end of the electric wire 64 of the second electrical cable 63 is inserted into the through-hole 58 of the heat insulator 56. The other end of the electric wire 64 and the connecting end 53a of the electrical lead 53 are soldered to each other.

As shown in FIGS. 6, 8A, and 8B, a sealant 71 having electrical insulation property is fixed to the lower surface of the heat insulator 56 and a fixed portion 62a (shown in FIGS.

5, 8A, and 8B) that is a vicinity of the through-hole 57 side end of the covering tube 62 of the first electrical cable 60. The through-hole 57 is covered with this sealant 71. Similarly, as shown in FIG. 6, a sealant 72 having electrical insulation property is fixed to the lower surface of the heat insulator 56 and a fixed portion 65a (shown in FIG. 5) that is a vicinity of the through-hole 58 side end of the covering tube 65 of the second electrical cable 63. The through-hole 58 is covered with this sealants 72.

The banding band 74 shown in FIG. 6 has flexibility and shape-retaining capability. Namely, the banding band 74 is deformed when a force is applied to the banding band 74, and the banding band 74 retains its shape when no force is applied to the banding band 74.

The banding band 74 is inserted into the band inserting hole 43 of the cable support 42 of the light shielding hood 39. Furthermore, the banding band 74 is fixed to the cable support 42 while coiling (contacting) around the vicinity of the light shielding hood 39 side end portion of the banding tube 67, which is brought into contact with the cable support 42. Namely, the vicinity of the light shielding hood 39 side end portion of the banding tube 67 is fixed to the cable support 42 by the banding band 74. In other words, supported portions 62b, 65b (see FIG. 5) of the covering tubes 62, 65, which are located inside the tube 67 and are formed at positions slightly away from fixed portions 62a, 65a respectively, are fixed to the cable support 42 by the banding band 74.

Figure 10:
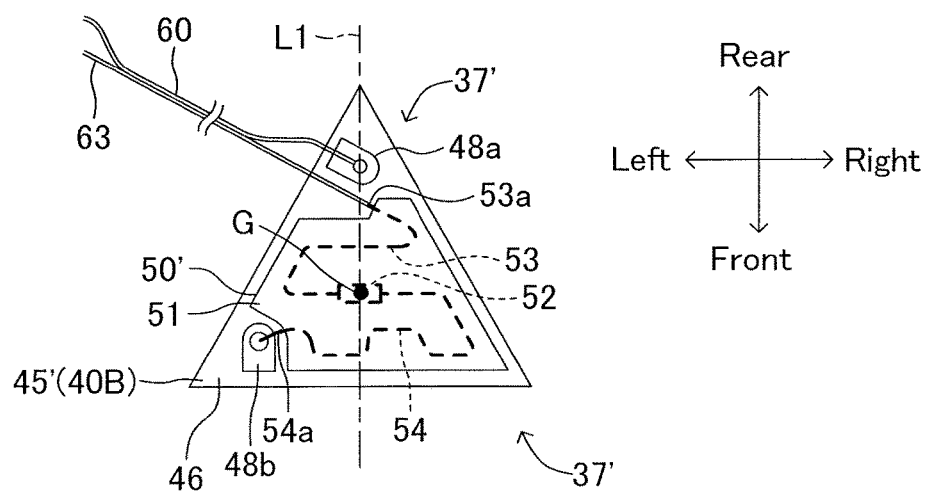
FIG. 10 is a schematic view, which is similar to that of FIG. 7, shows a light shielding and heating unit (a second set) having a structure bilaterally symmetrical to the light shielding and heating unit (the first set) shown in FIGS. 5 to 7.
Figure 11:
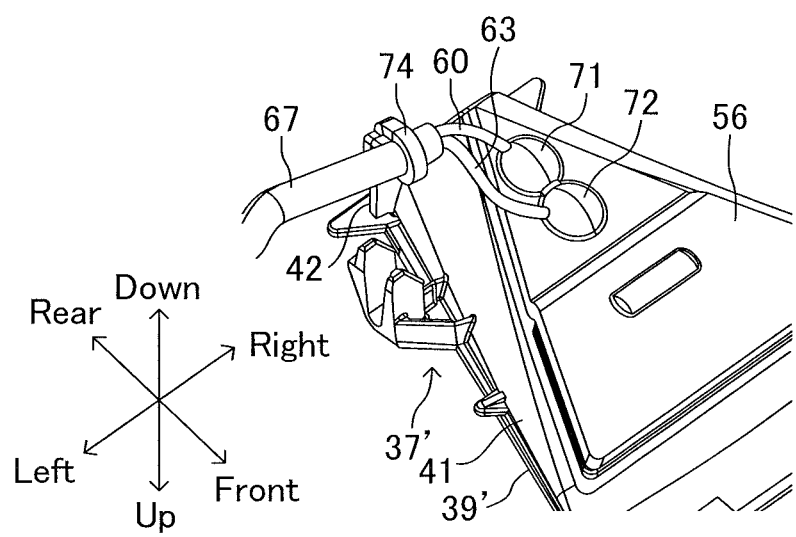
FIG. 11 is a perspective view, which is similar to that of FIG. 6, shows the light shielding and heating unit (the second set).

In addition, the photographing apparatus 10 of the present embodiment is provided with the light shielding and heating unit 37' shown in FIGS. 10 and 11. The light shielding and heating unit 37 described above and the light shielding and heating unit 37' can be selectively attached to the bracket 12.

This light shielding and heating unit 37' is provided with a light shielding hood 39', a heater module 45', a fuse module 50', the heat insulator 56, the cable module 59, and the banding band 74. With respect to the center line L1 the light shielding hood 39', the heater module 45', and the fuse module 50' are symmetrical to the light shielding hood 39, the heater module 45, and the fuse module 50, respectively. The specification of a heated portion 40B of the light shielding hood 39' is the same as that of the heated portion 40A. In other words, the heated portion 40B and the heated portion 40A are bilaterally symmetrical to each other with respect to the center line L1. In addition, a heater 47B of the heater module 45' is bilaterally symmetrical to the heater 47A with respect to the center line L1. The specification of the PET sheet 46 of the heater module 45' is the same as that of the PET sheet 46 of the heater module 45. The fuse 52 of the fuse module 50' of the light shielding and heating unit 37' is also overlaps the position of the center of gravity G of the heated portion 40B in the thickness direction of the heated portion 40B (see FIG. 10).

In this specification, the light shielding and heating unit 37' may be referred to as "second set 37'".

In FIGS. 1 through 8A and 8B as described above, the light shielding and heating unit 37 (the first set) is removably fixed to the bracket 12 with the light shielding hood 39 fitted to the support 13.

On the other hand, the light shielding and heating unit 37' (the second set) can be removably fixed to the bracket 12 instead of the light shielding and heating unit 37. In this case, the light shielding hood 39' is fitted to the support 13.

As shown in FIG. 4, the camera unit 25 is removably fixed to bracket 12 by engaging an engaging portion of the camera support bracket 18, which is integrated with the camera unit 25, with an engaging portion formed on the lower surface of the bracket 12.

Then, as shown in FIG. 2, the light shielding hood 39 of the light shielding and heating unit 37 (or the light shielding hood 39' of the light shielding and heating unit 37') is fitted to the hood support recess 27 of the camera unit 25. Further, the front portion of the imaging part 28 is located directly above the rear end portion of the heated portion 40A (or 40B) through the gap between the rear ends of the left and right side wall portions 41.

The main cover 76 is a single piece (integrally molded article) made of hard resin.

The main cover 76 is a hollow member whose whole upper surface and rear end surface are opened. The dimension in the forward and rearward direction and the dimension in the lateral direction of the main cover 76 are larger than those of the bracket 12, the camera support bracket 18, the camera unit 25, and the light shielding hood 39 (39'), respectively. Furthermore, an attaching recess 77 is formed in the rear portion of the bottom surface of the main cover 76.

The sub cover 80 is a single piece (integrally molded article) made of hard resin.

The sub cover 80 is removably fixed to the main cover 76 so as to be located in the attaching recess 77 by engaging an engagement portion thereof with an engagement portion of the main cover 76.

The main cover 76 and the sub cover 80, which are integrated with each other, are removably fixed to the lower surface of the bracket 12 so that the camera support bracket 18, the camera unit 25, and the light shielding hood 39 (or the light shielding hood 39') are located in the interior space of the main cover 76.

The connector 66 of the cable module 59 is drawn out of the main cover 76 rearward through the rear end opening of the main cover 76.

The photographing apparatus 10 assembled in this way is fixed to the vehicle interior side surface of the front extension part 86a of the light shielding sheet 86 by using adhesive (not shown) applied to each of the adhesive surfaces 14 of the bracket 12.

Then, the support 13 of the bracket 12, the heated portion 40A of the light shielding and heating unit 37 (or the heated portion 40B of the light shielding and heating unit 37'), and the imaging part 28 of the camera unit 25 are located at positions that face the light transmissive hole 86b of the light shielding sheet 86. Then, natural light, which heads rearward from the front of the front window 85 and passes through the light transmissive portion 85a and the light transmissive hole 86b of the light shielding sheet 86, is received by the imaging part 28 after passing through the lens 29 of the imaging part 28.

The connector 66 of the light shielding and heating unit 37 (37') is connected to a vehicle body side connector 66a provided in the vehicle body (see FIG. 9). Specifically, the anode and cathode of the connector 66 are connected to an anode and a cathode of the vehicle body side connector 66a, respectively. The body side connector 66a is connected to a constant-voltage circuit 88. Furthermore, the constant-voltage circuit 88 is connected to an automotive electric power source (battery) via an ignition switch (IG·SW). The voltage of electric power supplied to the vehicle body side connector 66a from the electric power source via the ignition switch and the constant-voltage circuit 88 is constant.

As shown in FIG. 9, the heater 47A (47B), the fuse 52, the electrical leads 53, 54, the first electrical cable 60, the second electrical cable 63, and the connector 66 form a series electrical circuit EC.

A switch element 89 is provided in the series electrical circuit EC. In addition, the switch element 89 can be switched between ON and OFF by the control unit 100. The switching element 89 can be composed of, for example, a semiconductor switching element.

In above described structure, the brake devices of the vehicle, the brake actuator, the vehicle speed detecting device, the control unit 100, and the image pickup device 30 are components of a pre-crash safety system (PCS).

Subsequently, an operation of the vehicle and the photographing apparatus 10 will be explained.

When the automotive electric power source is in a state where electric power thereof can be supplied to the series electrical circuit EC and an engine is started by an operation of the ignition key (not shown), the control unit 100 makes the imaging part 28 start the imaging operation, and the control unit 100 obtains outside air temperature from the temperature sensor 101.

The image pickup device 30 of the imaging part 28 images reflected luminous flux reflected backward by an obstacle (for example, another vehicle) located in front of the vehicle equipped with the photographing apparatus 10 and passing through the light transmissive portion 85a of the front window 85, the light transmissive hole 86b of the light shielding sheet 86, and the lens 29.

In addition, the imaging part 28 sends all imaging data to the control unit 100 every time when a certain period of time passes.

If the control unit 100 of the vehicle running forward determines that "an object of the imaging data is not an obstacle" or "distance from the image pickup device 30 to an obstacle is longer than the distance represented by the approach determination data", the vehicle continues to run forward. Noted that, the object type determination by the control unit 100 can be carried out by using, for example, well-known pattern matching method.

On the other hand, if the control unit 100 of the vehicle running forward determines that "current vehicle speed is within a predetermined range", and "an object of the imaging data is an obstacle and distance from the image pickup device 30 to an obstacle is shorter than the distance represented by the approach determination data", the control unit 100 sends signals to the brake actuator. Then, since the brake actuator is actuated, even when a driver does not depress the brake pedal, each of the brake devices exerts a braking force to each of the wheels. This causes the speed of the vehicle to be decreased or to be zero in some cases.

Temperature detection operation by the temperature sensor 101 is always executed while the engine is operated. It should be noted that before the temperature sensor 101 starts the temperature detection operation, the switch element 89 is in the OFF state.

The temperature sensor 101 constantly continues to send a signal representing detected temperature to the control unit 100 while the engine is operated.

By the way, at the low outside air temperature, when a heater is used inside the vehicle, condensation may be generated on the light transmissive portion 85a of the front window 85. Furthermore, when the outside air temperature is low, ice and/or frost may adhere on the light transmissive portion 85a. If such a phenomenon occurs on the light transmissive portion 85a, the image pickup device 30 may image blurred object image, or the image pickup device 30 can fail to image an obstacle.

In this case, the control unit 100 can fail to carry out the type determination of an object in the imaging data and the distance determination based on the approach determination data with accuracy.

When the temperature detected by the temperature sensor 101 is equal to or lower than a preset temperature set in advance, the control unit 100 makes (switches) the switch element 89, which was in the OFF state, to the ON state for a predetermined time, and then makes (switches) the switch element 89 to the OFF state for a predetermined time. While the temperature detected by the temperature sensor 101 is equal to or lower than the preset temperature, the control unit 100 carries out these operations repeatedly. When the switch element 89 is set in the ON state, the electric power of the electric power source is supplied to the series electrical circuit EC. Since the electric power is supplied to the heater 47A (47B) composed of electrically heated wire, the heater 47A (47B) generates heat.

As described above, the thermal conductivity of the heat insulator 56 is lower (worse) than those of the light shielding hood 39 (and the light shielding hood 39'), the PET sheet 46, the double-faced adhesive tape 47C, and the double-faced adhesive tape 51. Then, heat generated by the heater 47A (47B) is highly unlikely to escape outside from the lower surface and the peripheral surface of the heat insulator 56.

Then, most of the heat generated in the heater 47A (47B) is efficiently transmitted to the lower surface of the heated portion 40A (40B) from the heater 47A (47B) via the double-faced adhesive tape 47C, and is further transmitted to the entire heated portion 40A (40B).

As a result, radiant heat emitted from the upper surface (front surface) of the heated portion 40A (40B) is transmitted to the light transmissive portion 85a, and then condensation or the like on the light transmissive portion 85a is removed by this radiant heat. As described with reference to FIG. 4, since the cross-sectional shape of the heated portion 40A (40B) is convexly curved shape projecting toward the light transmissive portion 85a, the radiant heat emitted from the heated portion 40A (40B) is supplied to the entire light transmissive portion 85a while diffusing radially. In other words, the condensation and the like can be removed from the entire light transmissive portion 85a by the radiant heat.

Then, since the image pickup device 30 of the imaging part 28 can image a sharp object image, the control unit 100 can carry out the type determination of an object in the imaging data and the distance determination based on the approach determination data accurately.

However, if the heater 47A (47B) continuously generates heat for a long time, the heater 47A (47B), the heated portion 40A (40B), and peripheral portion thereof become excessively high temperature. This may cause a member located at the periphery of the heater 47A (47B) to be adversely affected by the heater 47A (47B). Namely, for example, the image pickup device 30 of the imaging part 28 can fail to image a sharp object image.

Then, when the temperature detected by the temperature sensor 101 is equal to or lower than the preset temperature, the control unit 100 switches the switch element 89 between the ON state and the OFF state at every predetermined time, instead of keeping the switch element 89 in the ON state for a long time. In other words, the control unit 100 prevents the heater 47A (47B) from generating heat continuously for a long period of time.

However, if short-circuit (ground fault) is generated in the series electrical circuit EC, which is not equipped with the fuse 52, in the manner of "short-circuit 1" of FIG. 9, the electric power of the electric power source is supplied to the heater 47A (47B) even when the control unit 100 keeps (switches) the switch element 89 in the OFF state. Namely, in this case, the electric power of the power source is continuously supplied to the heater 47A (47B) for a long time. Then, this causes the heater 47A (47B), the heated portion 40A (40B), and peripheral portion thereof to be excessively high temperature.

However, the photographing apparatus 10 of the present embodiment is provided with the fuse 52 disposed on the series electrical circuit EC.

The soluble metal of the fuse 52 is heated by heat transmitted from the heater 47A (47B) via the electrical leads 53, 54 and heat transmitted from the heated portion 40A (40B).

If the short circuit occurs in the manner of the "short-circuit 1" of FIG. 9, the heater 47A (47B) and the heated portion 40A (40B) become high temperature. Then, the temperature of the soluble metal, which was at a temperature lower than a predetermined value, becomes a temperature equal to or more than the predetermined value, and thus causes this soluble metal to be cut. Then, since the electric power of the electric power source fail to flow to the heater 47A (47B), the heater 47A (47B), the heated portion 40A (40B), and peripheral portion thereof are prevented from being excessively high temperature.

The heated portion 40A (40B) becomes high temperature when the heater 47A (47B) generates heat. The center of gravity G is the easiest portion to store heat in the heated portion 40A (40B). Furthermore, the heated portion 40A (40B) becomes gradually easier to escape (release) heat as approaching from the center of gravity G side to the peripheral portion side. Then, when the heated portion 40A (40B) is heated by the heater 47A (47B), the entire heated portion 40A (40B) fail to not become high temperature evenly. In other words, the center of gravity G of the heated portion 40A (40B) is the easiest portion to become high temperature, and the heated portion 40A (40B) becomes gradually easier to be lower temperature as approaching from the center of gravity G to the peripheral portion thereof.

Then, even when, for example, a short-circuit occurs in the series electrical circuit EC, the amount of heat transmitted to the fuse 52, which is overlapped the peripheral portion or a vicinity of the peripheral portion of the heated portion 40A (40B) in the thickness direction of the heated portion 40A (40B), from the periphery portion or the vicinity of the peripheral portion of the heated portion 40A (40B) via the PET sheet 46 fail to be large. Then, in this case, the fuse 52 hardly becomes high temperature, and thereby the fuse 52 hardly be cut even when short-circuit occurs.

In contrast, in this embodiment, the fuse 52 is easy to become high temperature, since the amount of heat transmitted to the fuse 52 from the center of gravity G of the heated portion 40A (40B) via the PET sheet 46 is large when short-circuit occurs in the series electrical circuit EC. Then, the fuse 52 is easier to be cut compared with the case where the fuse 52 is overlapped the peripheral portion or the vicinity of the peripheral portion of the heated portion 40A (40B) in the thickness direction of the heated portion 40A (40B). Then, the heater 47A (47B), the heated portion 40A (40B), and peripheral portion thereof can be prevented from being excessively high temperature more reliably.

In addition, the land 48a of the heater 47 (47B) is disposed in the vicinity of rear vertex of the PET sheet 46, while the land 48b is disposed in the vicinity of front right vertex of the PET sheet 46. Namely, the distance between the both ends of the heater 47A (47B) is a certain length. In other words, the distance between the both ends of the heater 47A (47B) is not extremely short. Then, the solder 70 provided on the land 48a and the solder provided on the land 48b are separated from each other with a certain distance.

Combined electrical resistance of an integral portion including the land 48a, which is one of both ends of the heater 47A (47B), and the solder 70, and combined electrical resistance of an integral portion including the land 48b, which is the other of both ends of the heater 47A (47B), and the solder are smaller than that of the heater 47A (47B) excluding the lands 48a, 48b.

Then, the land 48a (the solder 70) and the land 48b (the solder), which are at relative low temperature in the heater 47A (47B) when current flows through the heater 47A (47B), don't concentrate in one narrow area on the heated portion 40A (40B). Then, when the heated portion 40A (40B) is heated by the heater 47A (47B), the entire heated portion 40A (40B) easily becomes substantially even temperature.

Then, a portion of entire area of the light transmissive portion 85a fail to become much lower temperature compared with the other portion of the entire area of the light transmissive portion 85a. In other words, the entire light transmissive portion 85a is heated substantially evenly by the heated portion 40A (40B).

Furthermore, the distance between the solder 70 on the land 48a and the solder on the land 48b is a certain length. Then, if a foreign material (for example, water and/or dust) enters a space between these two solders, this foreign material is unlikely to come in contact with these two solders at the same time. In other words, short-circuit is unlikely to occur between the two solders by this foreign material.

In addition, the through-holes 57, 58 of the heat insulator 56 are covered by the pair of sealants 71, 72.

Thus, a foreign material (for example, water, dust, and the like) fail to enter a space between the heat insulator 56 and the heater module 45 (and the fuse module 50) through the through-holes 57, 58 from the outside of the heat insulator 56.

Thus, for example, short-circuit between the heater 47A (47B) and the electrical leads 53, 54 is unlikely to occur by a foreign material, and/or short circuit between portions different from each other of the heater 47A (47B) is unlikely to occur by a foreign material.

In addition, the pair of the sealants 71, 72 fix the fixed portion 62a of the covering tube 62 of the first electrical cable 60 and the fixed portion 65a of the covering tube 65 of the second electrical cable 63 to the heat insulator 56.

Furthermore, the vicinity portion of the light shielding hood 39 (39') side end of the tube 67 (in other words, the supported portion 62b of the covering tube 62 and the supported portion 65b of the covering tube 65) is fixed to the cable support 42 by the band 74.

Then, the end portion of the electric wire 61 of the cable 60 and the end portion of the electric wire 64 of the cable 63 are unlikely to be separated from the land 48a of the heater module 45 and the connecting end 53a of the fuse module 50 respectively, when a tensile loading in the direction to separate the first electrical cable 60 and the second electrical cable 63 from the heat insulator 56 is exerted on the first electrical cable 60 and the second electrical cable 63. In addition, the land 48a of the heater module 45 is unlikely to be peeled from the PET sheet 46 by a tensile loading, which the land 48a receives from the end of the electric wire 61 of the first electrical cable 60. Similarly, the connecting end 53a of the fuse module 50 is unlikely to be peeled from the heater module 45 together with the double-faced adhesive tape 51 by a tensile loading, which the connecting end 53a receives from the end of the electric wire 64 of the second electrical cable 63.

The banding tube 67 bundles the covering tube 62 and the covering tube 65.

In addition, the distance between the heater modules 45, 45' side end of the first electrical cable 60 (the electric wire 61) and the fuse modules 50, 50' side end of the second electrical cable 63 (the electric wire 64) is short. Then, the first electrical cable 60 extends outside from a first portion of the heater module 45, 45' and the second electrical cable 63 extends outside from a second portion of the fuse modules 50, 50'. Noted that, the second portion is close to the first portion.

Then, an arrangement (placement) of the first electrical cable 60 and the second electrical cable 63 in the vehicle can be carried out easier compared with the case where the covering tube 62 and the covering tube 65 are not be bundled, and the first electrical cable 60 extends from a third portion of the heater module 45, 45' and the second electrical cable 63 extends from a fourth portion of the fuse modules 50 50'. Noted that, the fourth portion is far from the third portion.

When an arrangement (placement) of the vehicle body side connector 66a (electrical system parts) in vehicle is changed, the drawing manner (drawing direction) of the first electrical cable 60 and the second electrical cable 63 from the heater modules 45, 45' and the fuse modules 50, 50' may have to be changed.

Then, as described above, the photographing apparatus 10 of the present embodiment is provided with the light shielding and heating unit 37 (the first set) and the light shielding and heating unit 37' (the second set), both of which can be selectively attached to the bracket 12.

The drawing manner (drawing direction) of the first electrical cable 60 and the second electrical cable 63 from the heater modules 45, 45' and the fuse modules 50, 50' (see FIGS. 6, 7, 10, and 11) can be changed by selectively attaching either the light shielding and heating unit 37 or the light shielding and heating unit 37' to the bracket 12. In other words, when the light shielding and heating unit 37 is used, as shown in FIGS. 6 and 7, the first electrical cable 60 and the second electrical cable 63 can be drawn out from the heater module 45 and the fuse module 50 towards the right side thereof. On the other hand, when the light shielding and heating unit 37' is used, as shown in FIGS. 10 and 11, the first electrical cable 60 and the second electrical cable 63 can be drawn out from the heater module 45' and the fuse module 50' towards the left side thereof.

In this way, the drawing manner (drawing direction) of the first electrical cable 60 and the second electrical cable 63 from the heater modules 45, 45' and the fuse modules 50, 50' can be changed while taking the arrangement (placement) of the vehicle body side connector 66a in the vehicle into account.

Note that, the present invention is not limited to the above embodiments, and it is possible to adopt various modifications within the scope of this invention.

Figure 12:
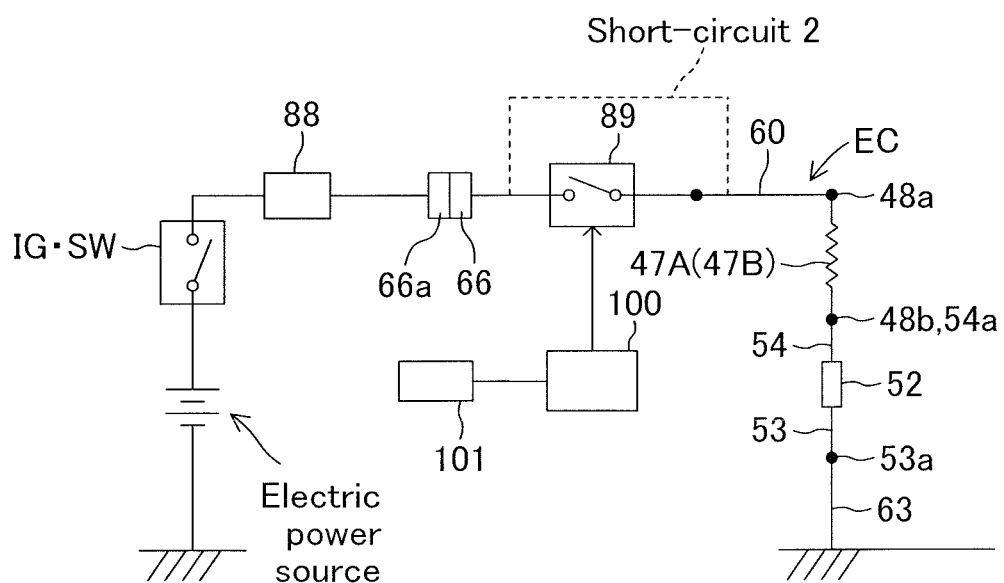
FIG. 12 is a schematic view, which is similar to that of FIG. 9, shows a series electrical circuit according to a first modified embodiment of the present invention.

For example, the series electrical circuit EC may be constructed in a manner of the first modification of the present invention shown in FIG. 12.

In this case, short-circuit (sky fault) may be generated in the manner of "short-circuit 2" in shown in FIG. 12 in the series electrical circuit EC.

In this case, however, when the soluble metal of the fuse 52 becomes temperature equal to or more than the predetermined value, the soluble metal is cut. Then, since the electric power of the electric power source fail to flow to the heater 47A (47B), the heater 47A (47B), the heated portion 40A (40B), and peripheral portion thereof are prevented from being excessively high temperature.

A device (means) other than the fuse 52 may be used as a current limiting element provided in a series electrical circuit EC.

Figure 13:
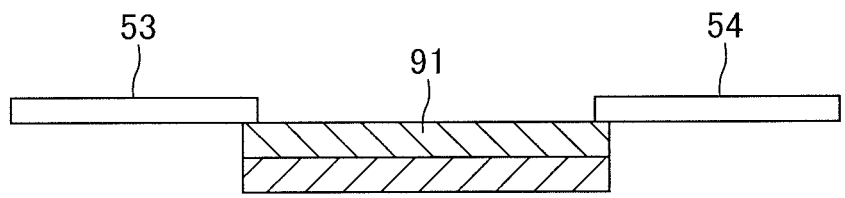
FIG. 13 is a cross sectional view of a main part of a series electrical circuit according to a second modified embodiment of the present invention in which a bimetal is used instead of the fuse module.
Figure 14:
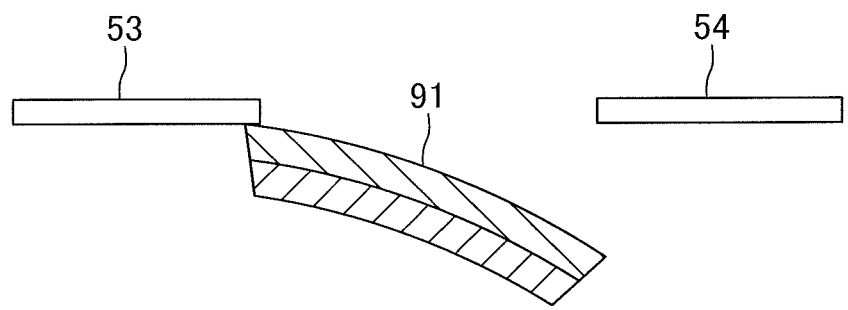
FIG. 14 is a cross sectional view similar to that of FIG. 13 when temperature of the bimetal of the second modified embodiment is high.

For example, in the second modification of the present invention shown in FIGS. 13 and 14, in place of the fuse 52, a bimetal 91 is provided between the ends of the pair of electrical leads 53, 54. One end portion of the bimetal 91 is fixed to one end portion of the electrical lead 53. On the other hand, the other end portion of the bimetal 91 can contact and separate from one end of the electrical lead 54.

When the temperature of the bimetal 91 is lower than a predetermined value, as shown in FIG. 13, the other end portion of the bimetal 91 is in contact with the one end portion of the electrical lead 54.

On the other hand, when the temperature of the bimetal 91 is equal to or more than the predetermined value, the bimetal 91 deforms to separate the other end portion thereof from the one end of the electrical lead 54 as shown in FIG. 14. Then, since the electric power of the electric power source fail to flow to the heater 47A (47B), the heater 47A (47B), the heated portion 40A (40B), and peripheral portion thereof are prevented from being excessively high temperature.

Figure 15:
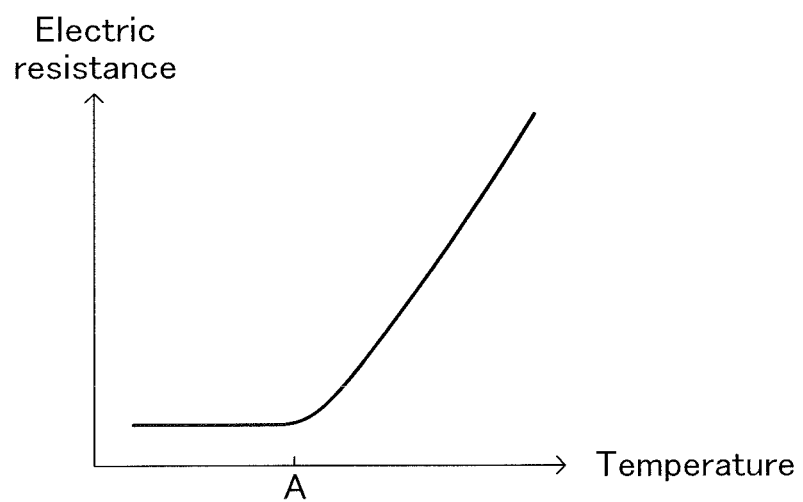
FIG. 15 is a graph showing character of a PTC thermistor which is used in a series electrical circuit according to a third modified embodiment of the present invention.

In the third modification of the present invention shown in FIG. 15, in place of the fuse 52, a PTC thermistor (not shown) is provided between the ends of the pair of the electrical leads 53, 54.

As is well known, the PTC thermistor has a property shown in the graph of FIG. 15. Namely, when the temperature of the PTC thermistor is in a lower temperature region that is lower than a predetermined value A, electrical resistance of the PTC thermistor is maintained at a predetermined low resistance value. However, when the temperature of the PTC thermistor is equal to or more than the predetermined value A, the electrical resistance of the PTC thermistor increases sharply.

Then, when the heater 47A (47B) becomes excessively high temperatures owing to short-circuit of the series electrical circuit EC and the heat of the heater 47A (47B) is transmitted to the PTC thermistor, the temperature of the PTC thermistor becomes equal to or more than the predetermined value A, and thereby the electrical resistance thereof increases sharply. Since the voltage value of the electric power supplied to the heater 47A (47B) from the constant-voltage circuit 88 is constant, when the electrical resistance of the PTC thermistor increases, the value of current flowing to the heater 47A (47B) is reduced. Then, since the temperature of the heater 47A (47B) is gradually reduced, the heater 47A (47B), the heated portion 40A (40B), and peripheral portion thereof are prevented from being excessively high temperature.

It should be noted that a thermostat other than both the bimetal 91 and the PTC thermistor may be provided between the electrical lead 53 and the electrical lead 54 as a current limiting element.

Figure 16:
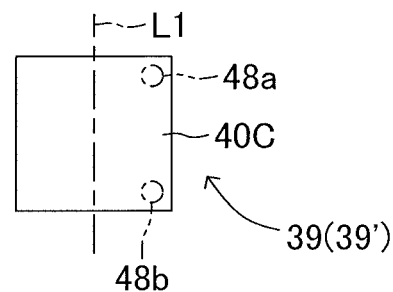
FIG. 16 is a schematic view of a heated portion according to a fourth modified embodiment of the present invention.

In the fourth modified embodiment of the present invention shown in FIG. 16, a heated portion 40C of the light shielding hood 39 (39') has a square shape. This heated portion 40C is also bilaterally symmetrical with respect to the center line L1.

Figure 17:
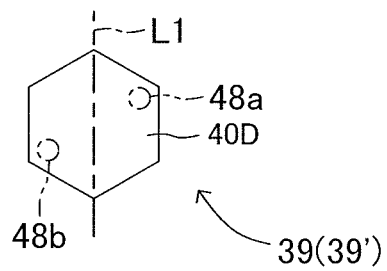
FIG. 17 is a schematic view of a heated portion according to a fifth modified embodiment of the present invention.

In the fifth modified embodiment of the present invention shown in FIG. 17, a heated portion 40D of the light shielding hood 39 (39') has a regular hexagon shape. This heated portion 40D is also bilaterally symmetrical with respect to the center line L1.

In these modifications, the land 48*a* and the land 48*b* of a heater, which are fixed to the heated portions 40C, 40D via the PET sheet (not shown), are arranged in the illustrated manner. In other words, in each of the modifications, the land 48*a* and the land 48*b* are positioned at different corner portions (the vertex adjacent corner portions or the vicinities of vertexes) of the heated portions 40C, 40D, respectively.

The photographing apparatus 10 of these modifications also can achieve the same effect as the above embodiment.

Furthermore, the heated portion of the light shielding hood 39 (39') may be a regular polygonal shape different from the heated portions 40A, 40B, 40C, and 40D.

In addition, the heated portion may have an approximately regular polygonal shape instead of exactly regular polygonal shape. Namely, for example, an outer peripheral portion of each of corner portions may be composed of a curved surface.

Additionally, the heated portion may have a polygonal shape or an approximately polygonal shape other than a regular polygonal shape (including an approximately polygonal shape). For example, the heated portion may be an isosceles triangle (that is not a regular triangle).

In addition, the design (shape) of the support 13 of the bracket 12 may be changed, and the light shielding hood 39 (39') may be mountable to the bracket 12 (the support 13). In this case, the light shielding hood 39 (39') can change (select) its rotational direction position (with respect to the support 13) by rotating the light shielding hood 39 (39') about an axis extending in the thickness direction of the heated portion.

In this way, the rotational direction position of the heated portions 40A of 40B, 40C, 40D of the light shielding hood 39 (39') can be easily changed. Namely, drawing manner (drawing direction) of the first electrical cable 60 and the second electrical cable 63 from the heated portions 40A, 40B, 40C, 40D (the heater modules 45, 45') can be easily changed.

In the above embodiment, the land 48*a* may be provided in a vertex adjacent corner portion of the PET sheet 46, instead of the vicinity of the vertex (the vicinity of upper vertex in FIG. 7). Namely, the land 48*a* may be provided at a position nearer to a vertex (the upper vertex in FIG. 7) of a corner portion than that of the above embodiment. Similarly, the land 48*b* may be provided in a vertex adjacent corner portion (for example, a right low vertex adjacent corner portion in FIG. 7) instead of a vicinity of vertex (for example, a vicinity of right low vertex in FIG. 7). Namely, the land 48*b* may be provided at a position nearer to a vertex (for example, the right low vertex in FIG. 7) of a corner portion than that of the above embodiment.

The switch element 89 may be configured to be changed between the ON state and the OFF state by a manually operable operating means (for example, a button provided on an instrument panel).

The light shielding hood 39, 39' may consist of the cable support 42 and the other portion. In this case, the cable support 42 and the other portion are produced independently, and the cable support 42 and the other portion are fixed to each other by a fixing means (for example, a bolt and a nut) after producing the cable support 42 and the other portion.

Instead of the image pickup device 30, both an infrared light emitting portion and an infrared light receiving portion, or both a light emitting portion and a light receiving portion of a millimeter-wave radar can be used as a distance measurement means of the camera unit 25.

In this case, a monocular type of image pickup device 30 can be used.

The camera unit 25 may be provided with only a distance measurement means (for example, both an infrared light emitting portion and an infrared light receiving portion, or both a light emitting portion and a light receiving portion of a millimeter-wave radar) with the imaging part 28 omitted from the camera unit 25.

A distance measurement means may be omitted from the camera unit 25.

The photographing apparatus for vehicle may be attached to another window part, which is different from the front window. For example, a photographing apparatus for vehicle may be attached to a back window of a vehicle so that the photographing apparatus for vehicle can detect an obstacle located at a rear position with respect to the vehicle.

Figure 18:
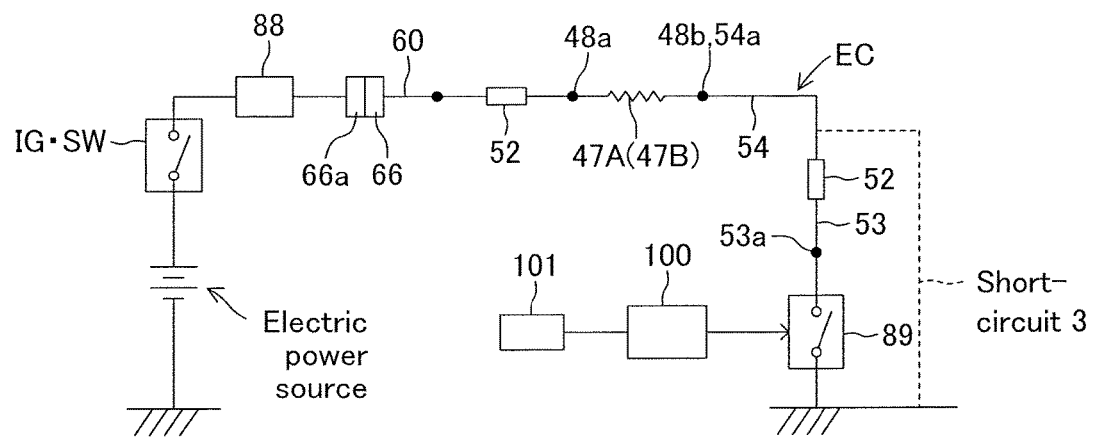
FIG. 18 is a schematic view, which is similar to that of FIG. 9, shows a sixth modified embodiment of the present invention.

As shown in FIG. 18, a series electrical circuit EC may be configured so that two current limiting elements (for example, two fuses 52) are positioned on both sides of the heater 47A (47B).

In this case, when short-circuit (ground fault) is generated in the series electrical circuit EC in the manner of "short-circuit 3", the electric power of the electric power source fail to be supplied to the heater 47A (47B). Then, the heater 47A (47B), the heated portion 40A (40B), and peripheral portion thereof are prevented from being excessively high temperature.

An electrical circuit, on which the heater 47A (47B), a current limiting element (for example, the fuse 52), the electrical leads 53, 54, the first electrical cable 60, the second electrical cable 63, the connector 66 are located, may be a parallel circuit rather than the series electrical circuits EC.

Figure 19:
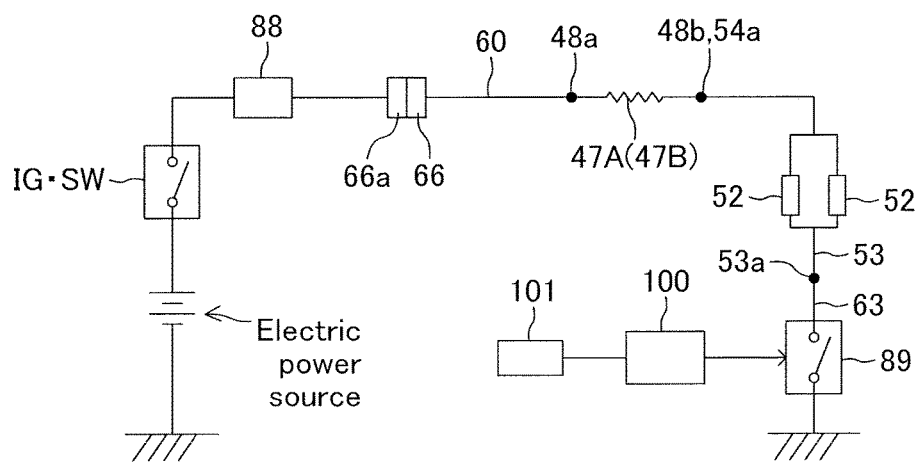
FIG. 19 is a schematic view, which is similar to that of FIG. 9, shows a seventh modified embodiment of the present invention.

For example, as shown in FIG. 19, when a portion of a parallel circuit branches into two parts, each of the two parts may be arranged so as to face the heated portion, and a current limiting element (for example, the fuse 52) may be provided on each of the two parts.

A photographing apparatus for vehicle may be provided in an automatic operation vehicle.

What is claimed is:

1. A photographing apparatus for vehicle comprising:
   image pickup means disposed inside of a window part that is made of translucent material and is provided in a vehicle, said image pickup means receiving photographing luminous flux passing through a light transmissive portion that is a portion of said window part;
   a heater, composed of electrically heated wire, for forming a portion of an electrical circuit connected to an electric power source, said heater generating heat when being supplied electrical power from said electric power source;
   a heated portion, fixed to said heater, facing an inner surface of said light transmissive portion, said heated portion giving radiant heat to said light transmissive portion when receiving heat from said heater;
   a bracket that supports said image pickup means and is supported by said inner surface of said window part;
   a middle part electrical lead provided in said heated portion, said middle part electrical lead connected at one end thereof to one end of said heater; and
   two electrical cables connected to said electric power source, wherein
   one of said two electrical cables is connected at one end thereof to the other end of said heater, the other of said two electrical cables is connected at one end thereof to the other end of said middle part electrical lead, said bracket includes a support capable of supporting said heated portion, said heated portion is a plate having a polygonal shape, both ends of said heater are positioned at two different corner portions of said heated portion, said heated portion is composed of a first heated portion and a second heated portion, said first heated portion and said second heated portion are symmetrical about the center line of said heated portion respectively and configured to be supported by said support, and said heater is composed of a first heater that is fixed to said first heated portion, and a second heater that is fixed to said second heated portion and is symmetrical to said first heater about said center line.

2. A photographing apparatus for vehicle according to claim 1, wherein, said heated portion has a regular polygonal shape.

3. A photographing apparatus for vehicle according to claim 1, wherein, a facing surface of said heated portion against said window part is a convexly curved surface projecting toward said window part.

4. A photographing apparatus for vehicle according to claim 1, wherein a first outer surface of the heated portion receives most of the heat from the heater.

5. A photographing apparatus for vehicle according to claim 1, wherein the corner portions of the heated portion include first and second corner portions, the one end of the heater is formed as a first land positioned at the first corner, and the other end of the heater is formed as a second land positioned at the second corner.

* * * * *